United States Patent [19]
Christenson et al.

[11] 3,880,796
[45] Apr. 29, 1975

[54] METHOD OF MAKING A NONAQUEOUS ACRYLIC COATING COMPOSITION

[75] Inventors: Roger M. Christenson, Gibsonia; Thomas R. Sullivan, Natrona Heights; Suryya K. Das, Pittsburgh; Rostyslaw Dowbenko, Gibsonia, all of Pa.

[73] Assignee: PPG Industries, Inc., Pittsburgh, Pa.

[22] Filed: Oct. 11, 1972

[21] Appl. No.: 296,700

[52] U.S. Cl. ... 260/33.6 UA; 260/33.6 R; 260/34.2; 260/39 M; 260/42.22
[51] Int. Cl. ...... C08f 47/20; C08g 53/18; C08j 1/46
[58] Field of Search ....... 260/34.2, 33.6 UA, 33.6 R

[56] References Cited
UNITED STATES PATENTS

| | | | |
|---|---|---|---|
| 3,365,414 | 1/1968 | Fisk et al. | 260/34.2 |
| 3,652,472 | 3/1972 | Clarke et al. | 260/33.6 UA |
| 3,666,710 | 5/1972 | Makhlouf et al. | 260/33.6 UA |
| 3,745,137 | 7/1973 | Reid et al. | 260/33.6 UA |

FOREIGN PATENTS OR APPLICATIONS
967,051   8/1964   United Kingdom ............... 260/34.2

*Primary Examiner*—Allan Lieberman
*Attorney, Agent, or Firm*—George D. Morris

[57] ABSTRACT

A solution of thermosetting polymer particles containing insoluble microgel particles is formed by polymerizing an ethylenically unsaturated monomer containing hydroxyl groups in a non-solvent for the polymer in the presence of a multifunctional dispersion stabilizer and the resultant dispersion is transformed into a sprayable solution by the addition of active solvents. The solutions are especially useful as automotive coatings.

9 Claims, No Drawings

METHOD OF MAKING A NONAQUEOUS ACRYLIC COATING COMPOSITION

There are many fields in which it is desirable to use acrylic polymer topcoats for purposes of protection and for aesthetic reasons. There are two general methods of preparing protective or decorative acrylic coatings, one of which is based on solution and the other on non-aqueous dispersion polymers. The first method which reaches back to the introduction of acrylic polymers into commercial use in coatings, is based on the traditional solution polymerization of acrylic monomers.

Two types of acrylic polymers have been widely used for both solutions and dispersions. The first is a thermoplastic non-crosslinking system that is applied as a lacquer. The second is a thermosetting acrylic dispersion which is a crosslinking system based on polymers with hydroxyl functionality cured with a melamine-formaldehyde resin. The solution polymer of either type is formulated according to methods well known in the art. The ingredients that are used in formulating a coating based on an acrylic solution polymer usually include pigments, fillers, plasticizers, flow aids, additional solvents and diluents and other materials which are collectively used to impart desired properties to the coating solution as well as to the coating film.

For reasons of economy it is important that the coating compositions can be applied rapidly and efficiently. In particular, with the constant striving for higher productivity in industry, methods of applying paint to yield a standard film thickness in two coats instead of three or more and which still produce a serviceable coating is clearly a desirable goal to those concerned with application of coatings in production.

As mentioned above, the second more recent method is based on non-aqueous dispersion polymers. The latter, which are now being introduced, are prepared by heating a mixture of acrylic monomers in the presence of a catalyst together with a dispersion stabilizer in organic solvents in which the polymer formed is substantially insoluble. The non-aqueous dispersion polymers, as produced according to the methods known in the art are desirable as they form easily pourable, essentially non-viscous liquids with substantially higher non-volatile contents than those in solution polymers.

The formulation of non-aqueous dispersion polymers into coatings is significantly different from formulations which are used for solution polymers. In order to retain the advantages of the non-aqueous dispersion technique throughout the preparation, storage, and application of the non-aqueous dispersion coatings, they are handled substantially as dispersions of particulate matter. Non-aqueous dispersion coatings in contrast to solution coatings, during their manufacture, storage, and application are formulated to take account of and retain the two phase nature of the dispersion polymer used. Solvent/diluent (non-solvent) ratios are selected with respect to evaporation rates which favor the enrichment of the percentage of solvent upon spray application of the coating because of more rapid evaporation of diluent. Finally, as the coating is subjected to baking temperatures common for industrial coating operations, the two phase dispersion polymer in the presence of active solvent is coalesced to form an integral coating film.

Obviously, the non-aqueous dispersions are not designed to be swamped with active solvents to then transform the dispersion to solution form as the advantages of the non-aqueous dispersions such as low viscosity, high solids and non-smog forming inexpensive diluents would be defeated thereby. Further, as one would expect the swamped dispersion to then have the same properties as a solution, it would be unwise to incur the added expense and consumption of time required to first form non-aqueous dispersion.

A particular disadvantage of non-aqueous dispersions is that the presence of coalescence during storage may cause the dispersion to gel or otherwise damage the physical properties to such a degree as to render the material unusable.

One way to improve poor storage stability of non-aqueous dispersion coatings, and the method most often resorted to, is to precisely balance the composition of the active solvents and/or plasticizers present with the content of diluents (non-solvent). Some approaches to the stability problem of non-aqueous dispersion coatings include the use of more effective dispersion stabilizers in order to provide better protection to the polymer particles against dissolution and gelation. This has not been entirely successful.

All of these previous approaches bring some relief to the problems encountered in formulating coatings from both solution and non-aqueous dispersion polymers. The growth of the organic coatings industry in recent years is one indication of the progress that has been achieved.

In the automotive industry, which is one of the important uses of acrylic coatings, the problems involving solution and non-aqueous dispersion coatings discussed above acquires specific urgency. Competitive pressure requires the original production finishing of automobiles to make the most effective use of labor and materials. Economizing production line space and capability of increasing speed of completing unit operations such as painting therefore become important. Topcoat finishing, for example, that can achieve the same protective film thickness and beauty with two spray applications when three or more are standard practice, is regarded as a valuable modification.

Prior to this invention, commercial thermosetting acrylic enamel topcoats required at least three spray applications, particularly when pigmentation contained metallic flake, to deposit films of requisite thickness and appearance. This invention concerns the solution of the above-mentioned problems and additionally realizes further advantages to be mentioned below.

The invention is primarily concerned with improvements in thermosetting acrylic enamels such as increased efficiency of application, the ability to apply a satisfactory coating in two coats rather than three, and high gloss and excellent metallic pattern control to give an aesthetically pleasing appearance.

It has now been found that a solution of thermosetting polymer particles containing insoluble microgel particles formed by polymerizing an ethylenically unsaturated monomer containing hydroxyl groups in a non-solvent for the polymer in the presence of multi-functional dispersion stabilizers and thereafter adding active solvents to actually form a solution but for the microgel particles may be sprayed to a high film build in two coats and increased coating efficiency and the resulting film will have dramatically improved resistance to solvent popping, gloss and pattern control.

The acrylic monomers to be polymerized in the non-aqueous dispersion polymer of the present invention contain from about 4 to about 30 percent by weight of hydroxy-containing compound. Examples of the hydroxy-containing polymerizable monomers are hydroxyalkyl acrylates and hydroxyalkyl methacrylates such as 2-hydroxyethyl acrylate, 2-hydroxypropyl acrylate, 4-hydroxybutyl acrylate, hydroxyhexyl acrylate, hydroxyoctyl acrylate, 2-hydroxyethyl methacrylate, 2-hydroxypropyl methacrylate, 4-hydroxybutyl methacrylate, hydroxyhexyl methacrylate, hydroxyoctyl methacrylate, allyl and methallyl alcohol, butyl hydroxyethyl maleate and fumarate, butyl hydroxypropyl maleate and fumarate, and the like. The preferred hydroxy containing alkyl acrylates contain up to about 8 carbon atoms in the alkyl group.

The hydroxyl containing acrylic monomers may be copolymerized with other copolymerizable monomers to form the polymer dispersion as long as the final polymer contains at least about 4 percent by weight of the hydroxyl containing monomer. Examples of other monomers which may be copolymerized with the hydroxyl containing monomers are alpha, beta ethylenically unsaturated monocarboxylic acids such as acrylic acid, methacrylic acid, crotonic acid, ethacrylic acid, 2-isopropylacrylic acid and the like. Esters of these acids such as butyl acrylate, 2-ethylhexyl acrylate, octyl methacrylate, lauryl methacrylate, and the like, may also be copolymerized with the hydroxyl containing monomers. Other copolymerizable monomers such as styrene, acrylonitrile, acrylamide, vinyl toluene, butyl hydrogen maleate and fumarate, methacrylonitrile, methyl methacrylatee, methyl acrylate, ethyl acrylate, butyl methacrylate, and the like, may also be used. Preferably, in order to impart compatability to the resulting polymer, the monomer system should also contain an ethylenically unsaturated carboxylic acid. It is preferred that the monomer system contain from about 0.5 percent to about 10 percent by weight of the acid.

The ethylenically unsaturated monomer or monomers are polymerized in a dispersing liquid which solubilizes the monomers but in which the resulting polymers are essentially not soluble and form dispersed polymer particles. The non-solvent is generally a hydrocarbon medium consisting essentially of liquid aliphatic hydrocarbons. A pure aliphatic hydrocarbon or a mixture of two or more be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances the amount of such non-aliphatic component may attain as high as 49 percent by weight of the entire liquid medium. However, the liquid medium preferably consists essentially of aliphatic hydrocarbons and, in general, the compositions of the present invention contain less than 25 percent by weight based on the weight of the liquid medium of an aromatic hydrocarbon and often none at all at this stage.

It is essential that the hydrocarbon be of liquid character, but it may have a wide boiling range from a minimum of about 30°C. (in which case high pressures may be needed in the polymerization) to a maximum which may be as high as 300°C. For most purposes, the boiling point should be from about 50° up to about 235°C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35°C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° to 300°C.

Examples of non-solvents useful herein are pentane, hexane, heptane, octane, mixtures of the same, and the like.

Ordinarily, the polymerizable composition of monomers and nonsolvent should contain from about 30 to about 80 percent by weight of the non-solvent. It is understood, however, that the monomeric solution need contain only that amount of non-solvent necessary to solubilize the monomers and maintain the resulting polymers in a dispersed state after polymerization.

The monomers are polymerized in the presence of dispersion stabilizers.

The dispersion stabilizer used in this invention is a branched copolymer comprising two types of polymer components of which one segment is solvated by the aliphatic hydrocarbon solvent and is usually not associated with polymerized particles of the polymerizable ethylenically unsaturated monomer and the second type is an anchor polymer of different polarity from the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The dispersion stabilizer comprises two segments. The first segment (A) comprises the reaction product of (1) a long-chain hydrocarbon molecular which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reaction producing a polyester or polyether. Preferably the polyester reaction is a simple one involving a monohydroxylic mono carboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized, such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacids with diols. For example, 1,12-dodecanediol may be reacted with sebacic acid or its diacid chloride to form a component solvatable by aliphatic hydrocarbons.

The preferred polymeric segment (A) of the dispersion stabilizer is formed by reacting poly-(12-hydroxystearic acid) with glycidyl methacrylate.

The second polymeric segment (B) of the dispersion stabilizer is of polarity different from the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids such as acrylic acid, methacrylic acid, 3-butenoic acid, crotonic acid, itaconic acid, and others mentioned previously which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually combined entities, the segment (A) being attached to the backbone of the graft copolymer and the segment (B) being carried in or on the backbone.

The monomer solution containing the stabilizer preferably contains from about 1 to about 25 percent by weight of the stabilizer and from about 30 to about 70 percent by weight of the ethylenically unsaturated monomers to be polymerized.

The polymerization may be carried out in a conventional manner, utilizing heat and/or catalysts and varying solvents and techniques. Generally, a free radical catalyst such as cumene hydroperoxide, benzoyl peroxide or similar peroxygen compound, or an azo compound such as azobis(isobutyronitrile) is employed.

The resulting non-aqueous acrylic dispersion must contain at least about 0.5 percent by weight based on polymer solids of microgel particles dispersed therein. These microgel particles have substantially the same refractive index as that of the polymerized ethylenically unsaturated monomers and have particle sizes from about 1μ to about 40μ. The microgel particles are essentially insoluble in tetrahydrofuran and are substantially crosslinked.

It is noted that the presence of at least 0.5 percent by weight of microgel is critical to this invention. It has been found that the presence of the microgel particles offers a unique improvement over conventional solutions to be used as topcoats in that the film build (thickness of the film), gloss, efficiency of film deposition and pattern control with metallic pigments are substantially improved.

The compositions may also contain other ingredients such as crosslinking agents, coalescing agents, catalysts, plasticizers, fillers, pigments, and the like. This invention is particularly useful in the deposition of films containing metallic pigments such as aluminum, nickel, stainless steel, or the like, as the pattern control of the resulting film is excellent.

Prior to the addition of aminoplast resin to the composition, active solvents for the acrylic non-aqueous dispersion polymer are added. Examples of active solvents are either aromatic hydrocarbons or oxygenated solvents such as esters, ketones, ethers, ether alcohols, and halogenated hydrocarbons. Examples of these active solvents are ethoxyethyl acetate (cellosolve acetate), 2,2,4-trimethyl 1,3-pentanediol monoisobutyrate, acetone, toluene, methyl ethyl ketone, methyl isobutyl ketone, diisobutyl ketone, methyl isoamyl ketone, diethyl ether, amyl acetate, butyl acetate, ethylene glycol diacetate, cyclohexanone, trichlorotrifluoroethane, trichloromonofluromethane, 2-nitro propane, and the like.

The addition of the active solvent will bring the dispersion into essentially solution form. The bulk of the acrylic polymer will be essentially solvated while the microgel particles are insoluble in the solution. The ratio of the active solvents to dispersing liquid or non-active solvent should be from about 35:65 to about 90:10. The resulting mixture usually comprises from about 30 to about 70 percent by weight dissolved polymer, from about 3 to about 45 percent by weight dispersing liquid, from about 10 to about 65 percent by weight active solvent, from about 1 to about 25 percent by weight dispersion stabilizer.

The polymer solution is then mixed with an aminoplast resin to thermoset the polymer. The aminoplast resins used as crosslinkers for the polymer dispersion are aldehyde condensation products of melamine, urea, acetoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amino group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N'-dimethyl urea, benzylurea, N,N'-ethyleneurea, diazine diamide, formoguanamine, benzoguanamine, ammeline, 2-chloro-4,6-diamino-1,3,5- triazine, 3,5-diaminotriazole, 4,6-diaminopyrimidine, 2,4,6-triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

The aminoplast resin should comprise from about 5 percent to about 50% by weight of the composition. The aminoplast may be merely added to the composition or, if desired, may be added at elevated temperatures such as 40°C. or higher.

The compositions are quite useful as coatings or substrates. The compositions are merely applied to the substrate and baked at 150° to 350°F. for about 5 to about 60 minutes to cure the coating on the substrate. The coatings may be applied by any conventional means such as spray coating, dip coating, roll coating, and the like. The preferred method especially for compositions containing metallic pigments is spray coating as the compositions containing microgel particles can be applied with good efficiency and film build and metallic pigment pattern control.

Any substrate such as paper, metal, wood, paperboard, plastic, and the like may be coated with the composition. The preferred substrate is metal or primed metal such as found in automobile bodies.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE 1

A flask was charged with 440 grams of an aliphatic hydrocarbon mixture of hexane and heptane, 195 grams of VM&P naphtha and 32 grams of methyl methacrylate, 93.2 grams of ethyl acrylate, 8 grams of 2-hydroxyethyl methacrylate, 4.8 grams of methacrylic acid, 2.8 grams of azobis isobutyronitrile and 49 grams of a dispersion stabilizer comprising a 36.4 percent solids solution of 44 percent methyl methacrylate, 4.9 percent glycidyl methacrylate, 50.4 percent of a reaction product of 90.3 percent poly-12-hydroxy-stearic acid and 9.7 percent glycidyl methacrylate, and 0.7 percent methacrylic acid in a solvent solution comprising 55 percent butyl acetate, 20 percent ethyl acetate, 4.5 percent toluene, and 20.5 percent VM&P naphtha. The charge was heated to reflux at 84°C. and after 20 minutes a mixture comprising 128 grams of methyl methacrylate, 396.8 grams of ethyl acrylate, 32 grams of 2-hydroxyethyl acrylate, 19.2 grams of methacrylic acid, 11.2 grams of azobis(isobutyronitrile) and 196 grams of the above dispersion stabilizer was added dropwise during a period of 3 hours. Reflux was continued for another 3 hours and the mixture was cooled and filtered.

To 17 grams of the above thermosetting acrylic polymer dispersion were added 1.5 grams of a melamine-formaldehyde resin (Cymel 301), 1.5 grams of toluene, 0.1 gram of butanol and 6 drops of a commercial mixture of mono and dibutyl phosphates. The resulting composition was found to contain about 6 percent by weight of microgel particles based on non-volatiles.

The above composition was thinned to a viscosity of 30 seconds measured in a No. 4 Ford cup with a 90/10 mixture of xylene and butanol and further thinned to a 25 percent volume reduction with a 1:1 xylene and solvesso 100 aromatic solution to a viscosity of 17 seconds measured in a No. 4 Ford cup and sprayed onto a steel substrate and baked for 30 minutes at 250°F. to yield a film having excellent gloss and flexibility.

EXAMPLE 2

A flask was charged with 386.5 grams of heptane, 386.5 grams of hexane, 64.8 grams of methyl methacrylate, 4.6 grams of azobisisobutyronitrile and 18.0 grams of a dispersion stabilizer comprising a 36.4 percent solids solution of 44 percent methyl methacrylate, 4.9 percent glycidyl methacrylate, 50.4 percent of the reaction product of 90.3 percent poly-12-hydroxystearic acid and 9.7 percent glycidyl methacrylate and 0.7 percent methacrylic acid and heated to reflux at 77°C. After heating for 20 minutes the flask was charged with 146 grams of hydroxyethyl acrylate, 37.5 grams of methacrylic acid, 438 grams of styrene, 285 grams of butyl methacrylate, 193.2 grams of methyl methacrylate, 292 grams of ethyl hexyl acrylate, 4.5 grams of octyl mercaptan, 10 grams of azobisisobutyronitrile, 11 grams of hydroxyethyl ethylene imine and 423 grams of the dispersion stabilizer over a period of 3 hours. After an additional hour at 88.5°C. 2 grams of azobisisobutyronitrile were added and for the next 2½ hours 2 grams of azobisisobutyronitrile were added every one-half hour. The composition was cooled and 150 grams of heptane and 150 grams of hexane were added. The dispersion had a solids content of 52.2 percent and an acid value of 6.06.

To 60 parts of the above solution were added 40 parts melamine formaldehyde resin and 2 parts of aluminum pigment. The paint so formulated was then sprayed in automatic spraying equipment to a metal substrate.

The properties of the films formed by baking the above coating was compared to those of a film formed by the same method but wherein the microgel particles were removed by diluting, centrifuging, and separating the microgel from the acrylic polymer.

The properties of the microgel-containing film were also compared to a film formed by polymerizing the same basic monomers without stabilizers in active solvents and adding the same amount of aminoplast and aluminum pigment. No microgel was formed thereby.

All of the compositions were applied by adding a solvent solution of 90 parts of xylene and 110 parts of butanol to obtain a viscosity of 30 seconds measured by a No. 4 Ford cup and further reducing to a 25 percent volume reduction with 1:1 of xylene and Solvesso 100 to a viscosity of 17 seconds measured by a No. 4 Ford cup and spraying the coatings and baking for 30 minutes at 250°F. to cure.

The results are given below in Table I.

Table I

| Example | Preparation | Coats | Film Build (mils) | Pattern Control | 20° Gloss |
| --- | --- | --- | --- | --- | --- |
| 2 | Contains Microgel | 2 | 1.78 | very good | 80 |
| Control A | Microgel Removed | 2 | 1.70 | fair–poor | 77 |
| Control B | Contains No Microgel | 2 | 1.62 | fair–poor | 70 |

Thus it is seen that the film build, gloss and pattern control of the microgel containing composition was superior to those of the conventionally prepared composition and to the same composition with the microgel removed.

The pattern control and gloss reading of the microgel containing solution was also compared to that of the same polymer dispersion formed and mixed in a 60:40 ratio with melamine formaldehyde and 2 percent aluminum pigment which was reduced with aliphatic hydrocarbon (non-solvent) to a spraying viscosity. This composition contained 22 percent active solvent and 78 percent non-active solvent. The pattern control of the dispersion coating was inferior to that of the solution coating and the 20° gloss of the dispersion coating was only 69.

According to the provisions of the patent statutes, there is described above the invention and what are now considered to be its best embodiments. However, within the scope of the appended claims, it is to be understood that the invention can be practiced otherwise than as specifically described.

We claim:

1. A method of preparing a nonaqueous polymeric composition comprising
    a. polymerizing a multifunctional dispersion stabilizer and ethylenically unsaturated monomers in the presence of a dispersing liquid which is a solvent for said ethylenically unsaturated monomers to form a non-aqueous dispersion of acrylic polymer and at least 0.5 percent by weight microgel particles, wherein
        1. said ethylenically unsaturated monomers comprise
            a. from about 4 to about 30 percent by weight hydroxy-containing ethylenically unsaturated monomer, and
            b. from about 0.5 to about 10 percent by weight ethylenically unsaturated carboxylic acid.
        2. said multifunctional dispersion stabilizer is a branched copolymer containing two polymeric segments of which one segment is solvated by said dispersing liquid and said second segment is
            a. an anchor polymer of different polarity to said first segment,
            b. relatively non-solvatable by said dispersion liquid, and
            c. contains pendant groups which are copolymerizable with said ethylenically unsaturated monomers
        3. said dispersing liquid consists essentially of liquid aliphatic hydrocarbons having a boiling point in the range of from about 30° to 300°C.
        4. said microgel particles
            a. being substantially crosslinked,
            b. being substantially insoluble in tetrahydrofuran
            c. having substantially the same refractive index as that of said acrylic polymer, and
            d. being of size in the range of from about 1 to about 40 microns, and
    b. adding active solvent to said nonaqueous dispersion to form a solution of said acrylic polymer containing dispersed microgel particles wherein the ratio of said active solvent to said dispersing liquid is in the range of from about 35:65 to about 90:10.

2. The method of claim 1 wherein said multifunctional dispersion stabilizer is formed by
    a. graft polymerizing
        1. the reaction product of glycidyl methacrylate and poly(12-hydroxystearic acid),
        2. methyl methacrylate, and
        3. glycidyl methacrylate
    to form a copolymer product containing pendant epoxy groups; and
    b. reacting said pendant epoxy groups with methacrylic acid.

3. The method of claim 1 wherein
    a. said ethylenically unsaturated monomers to be polymerized comprise from about 30 to about 70 percent by weight of said ethylenically unsaturated monomers to be polymerized, said multifunctional dispersion stabilizer and said dispersing liquid; and
    b. said multifunctional dispersion stabilizer comprises from about 1 to about 25 percent by weight of said ethylenically unsaturated monomers to be polymerized, said multifunctional dispersion stabilizer and said dispersing liquid.

4. The method of claim 1 wherein the hydroxy-containing monomer is copolymerized with other ethylenically unsaturated monomers.

5. The method of claim 4 wherein said other ethylenically unsaturated monomer is styrene.

6. The method of claim 1 wherein one polymerizable ethylenically unsaturated monomer containing reactive hydroxyl groups is the hydroxy alkyl ester of acrylic or methacrylic acid.

7. The method of claim 1 wherein an aminoplast resin is added to aid in the curing of the polymerized hydroxy-containing monomer.

8. The method of claim 7 wherein the aminoplast resin comprises from about 5 to about 50 percent by weight of the composition.

9. The method of claim 8 wherein the composition comprises metallic pigments.

* * * * *